Feb. 16, 1960    J. R. JOHNSON    2,925,030
BOTTLE DECORATING MACHINE AND BOTTLE CHUCKING DEVICE THEREFOR
Filed May 27, 1957    4 Sheets-Sheet 1
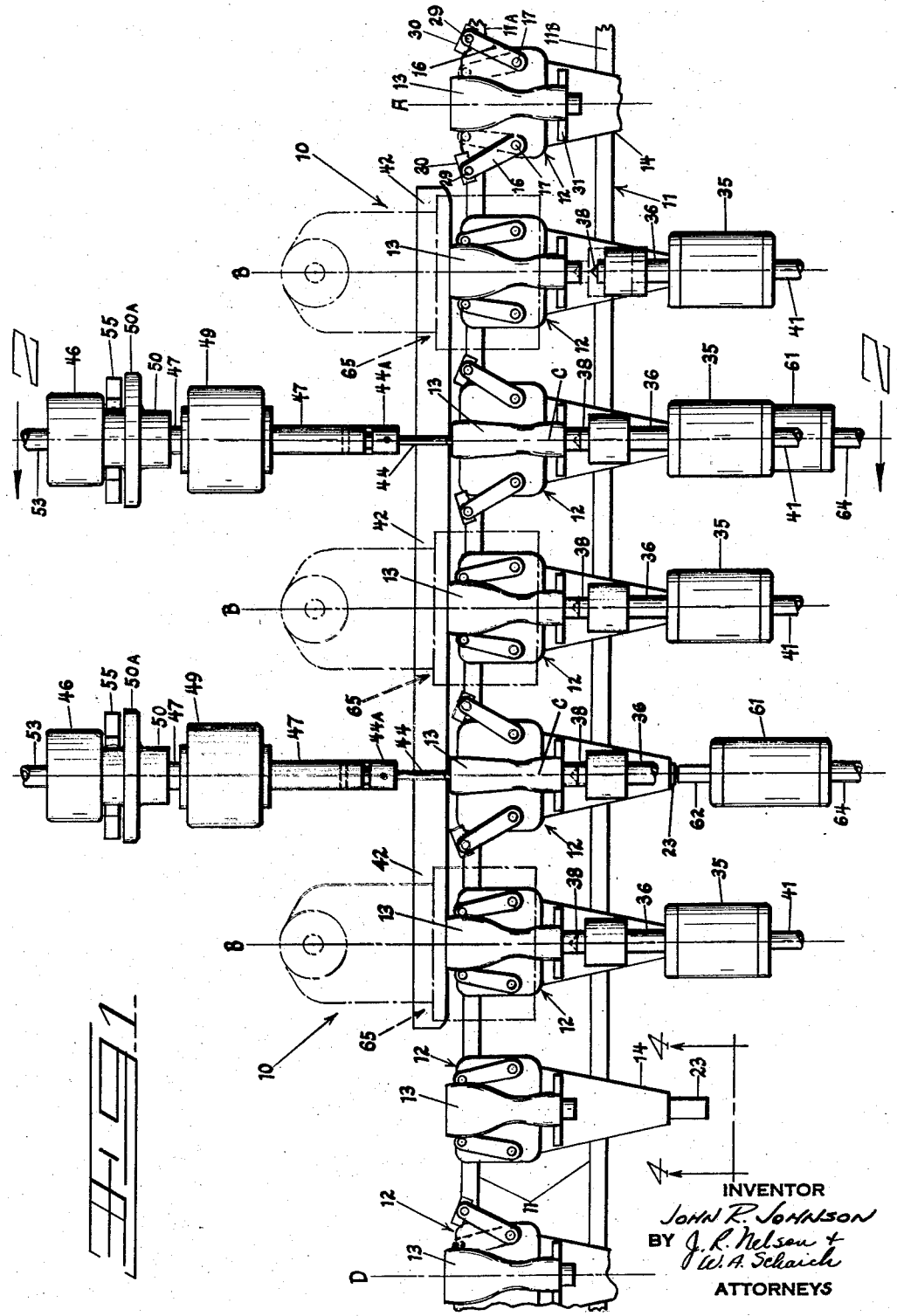
INVENTOR
JOHN R. JOHNSON
BY J. R. Nelson +
   W. A. Schaich
ATTORNEYS

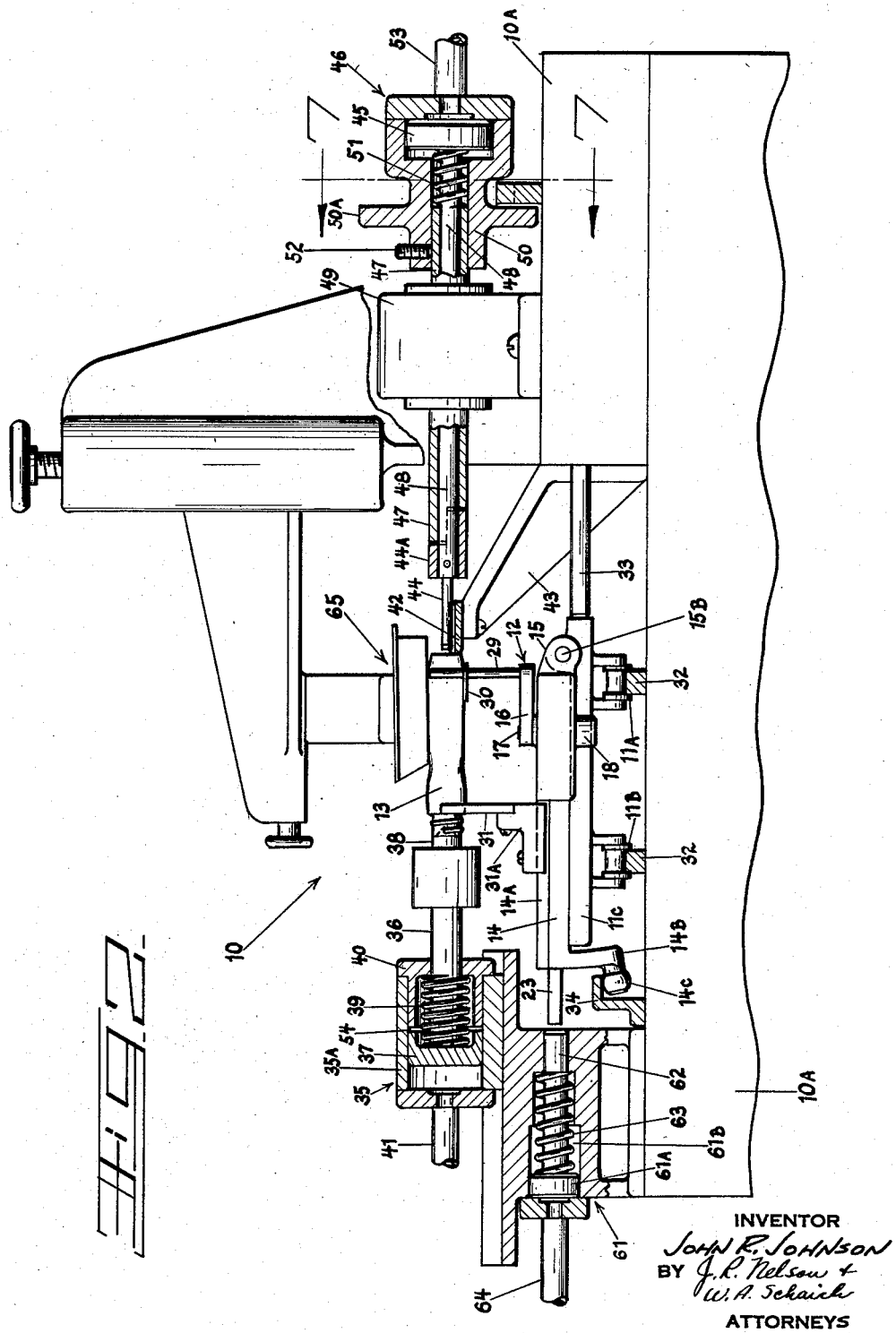

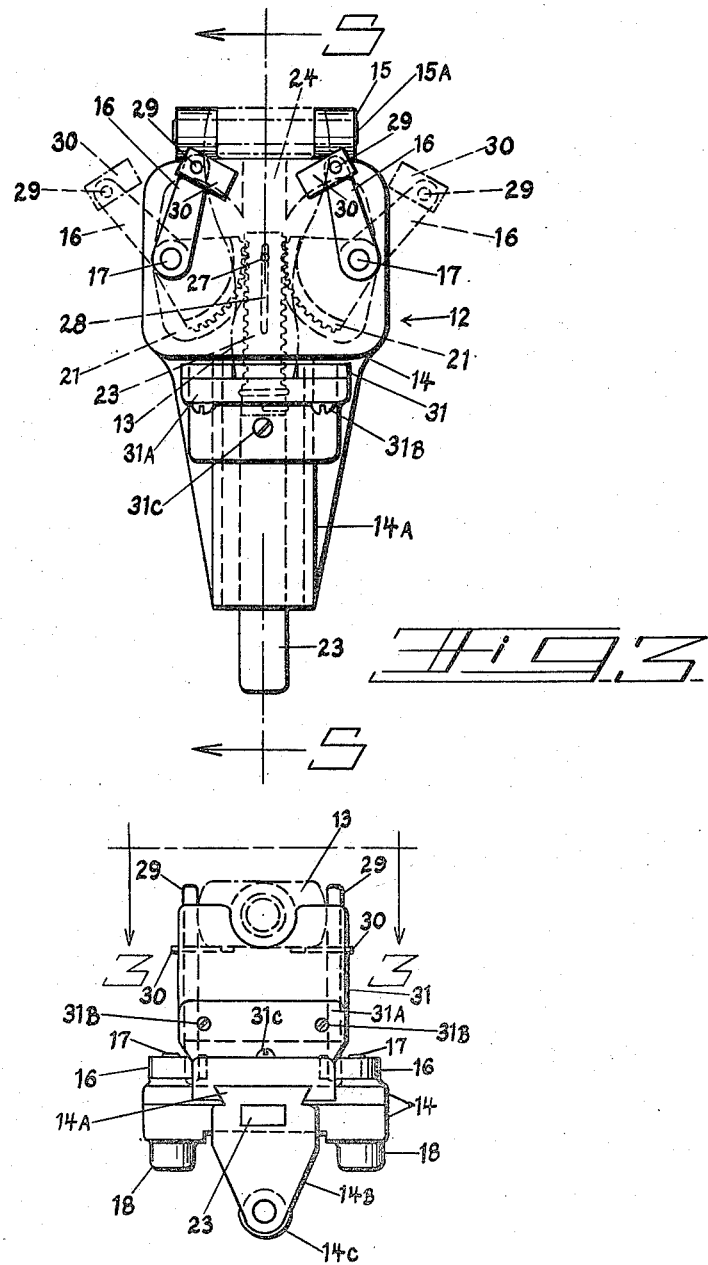

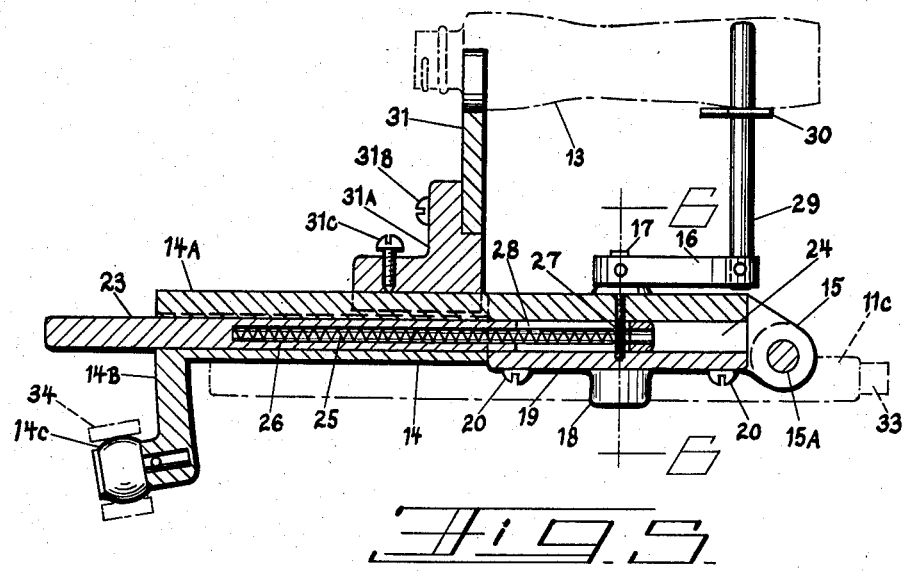
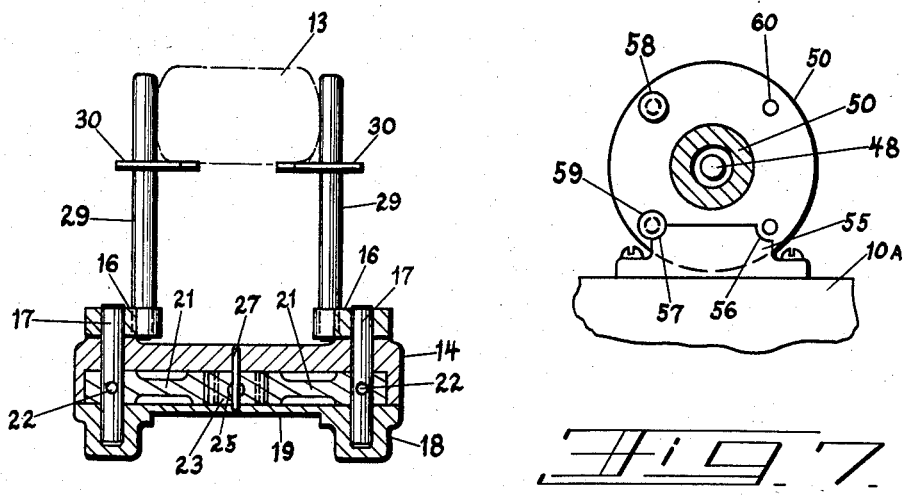

_United States Patent Office_ 2,925,030
Patented Feb. 16, 1960

2,925,030

BOTTLE DECORATING MACHINE AND BOTTLE CHUCKING DEVICE THEREFOR

John R. Johnson, Toledo, Ohio, assignor to Owens-Illinois Glass Company, a corporation of Ohio Application May 27, 1957, Serial No. 661,761

16 Claims. (Cl. 101—115)

This invention relates to improvements in automatic bottle decorating machines for marking or decorating irregularly shaped bottles and like articles, and includes a novel bottle chucking device therefor.

In such machines, bottles, or similar work pieces, are loaded into a holding device at a loading station. These devices are mounted in the machine to travel by indexing movement to one or more decorating stations where the bottle is thereat supported in a decorating position with its surface to be decorated positioned adjacent the underside of a decorating device such as a screen. The screen is provided with the decoration to be applied to the bottle surface and colorant material contained at the upper side of the screen is worked through its decoration pattern in any well-known manner, such as by reciprocating movement of a squeegee. The bottle is then moved in its holding device to other stations for rotating it axially to permit decoration of another of its sides, further decoration at the newly presented side, or multi-color decoration on any given side. The combination of movements and operations performed on the bottle will, of course, depend upon the nature of the overall decoration called for. Finally, the bottle is moved to its unloading station where it is removed from its holding device for further processing or packing as the case may be.

To apply the color decoration to the bottle, the decorating screen being in a fixed position on the machine, the bottle must be presented at the decorating station or stations so that it is in proper axial and surface alignment with relation to the decoration pattern held in the screen. Commercial requirements demand that each bottle be decorated to uniformly present the specified design.

Proper alignment of the decorated surface is of great importance in all types of bottle decorations. However, where multi-color decorations are applied, each color of the decoration must necessarily be applied at a different decorating station; hence, it is equally important that the colors applied individually at each decorating station are in proper registry with the other colors of the entire decoration. The apparatus of the present invention is primarily adaptable to accomplish registration for decoration of irregularly shaped bottles, such as square milk bottles, panels, and complex shapes such as are often employed in modern day fanciful packaging of goods, for example, cosmetics. The drawings hereinafter described and which disclose a preferred embodiment of the invention, illustrate one such complex shape of bottle as an irregularly shaped bottle.

It is, accordingly, an object of the present invention to provide improvements in a decorating machine for moving bottles or similar work pieces to which decorations are to be applied through the various stations of the machine from loading to unloading and applying the decoration uniformly to each in constant accurate alignment and registry of decoration and the colors thereof at each of the decorating stations.

Another object of the invention is to provide a device for use in a decorating machine that will hold bottles and align them for decoration.

Another object of the invention is to provide such a holding device that will open and close to permit rotation of the bottle about its own axis to present different bottles surfaces for decoration and will realign and register the bottle in like relationship for subsequent decorating operations.

A further object of the invention is to provide a bottle supporting device that will position the bottle to permit registry of colors for multi-color decorations.

The specific nature of this invention, as well as other objects and advantages thereof, will become apparent to those skilled in the art from the following detailed description, taken in conjunction with the annexed several sheets of drawings on which, by way of preferred example only, is illustrated one embodiment of this invention.

On the drawings:

Fig. 1 is a plan view of the straight line decorating assembly of an automatic decorating machine, incorporating the present invention.

Fig. 2 is a sectional elevational view taken along line 2—2 of Fig. 1.

Fig. 3 is a plan view of the bottle chucking devices of the invention and is taken along lines 3—3 of Fig. 4.

Fig. 4 is an end elevational view of the bottle chucking device in Fig. 3, and is taken along lines 4—4 of Fig. 1.

Fig. 5 is a sectional elevational view taken along lines 5—5 of Fig. 3.

Fig. 6 is a sectional elevational view taken along lines 6—6 of Fig. 5.

Fig. 7 is a sectional elevational view taken along lines 7—7 of Fig. 2.

In Fig. 1, the decorating assembly of a decorating machine, referred to generally at 10, includes an endless conveyor 11 driven to run from right to left in Fig. 1 by intermittent indexing movement. Mounted thereon are a plurality of bottle chucking devices 12, to be presently decribed in detail. The conveyor 11 is preferably constructed of a pair of chains 11A and 11B spaced in parallel relationship and each connected to travel endlessly around end sprockets (not shown) at opposite ends of the conveyor span which defines the length of travel of the conveyor. At one end of the conveyor, the pair of sprockets are mounted on a shaft and spaced according to the parallel spacing of the chains 11A and 11B. The shaft is driven by a conventional drive unit (not shown) for providing intermittent advancing movement of conveyor 11, and bottle chucking devices 12.

This intermittent advancing movement of the conveyor 11, as will be seen presently, indexes bottle chucking devices 12 to various points along the decorating assembly of machine 10 where various operations are performed on the bottles necessary to apply the desired decoration. These operations, as will appear herein, are performed at various fixed locations shown equally spaced along the path of movement of the conveyor and will be referred to as stations. In this connection, it is herein illustrated but one example of decorating job calling for a certain cycle of operations of the machine 10 for applying the desired decoration. Obviously, the numerous different types of decorating jobs called for in present-day commercial operations require that the cycle of operations on the machine be flexible.

Generally, the basic operations for applying a given single surface decoration on a bottle requires loading the bottle into the machine at a loading station, decorating it on the one surface at one or more decorating stations, depending of course on whether the decoration called for is single or multiple colored, and unloading the bottle from the machine at an unloading station. Where more than one surface of the bottle is to be decorated, an additional operation is included whereby the bottle is rotated about its own axis at a bottle rotating station to present the various surfaces in position for decoration. This bottle rotating operation generally occurs between bottle decorating operations.

In the example shown in Fig. 1, the decorating cycle for the job is set up so that bottle 13 is loaded into a bottle chucking device 12 during a dwell at the bottle loading station A. Subsequently, conveyor 11 is indexed from right to left to bring chucking device 12 and its bottle 13 to dwell at the first bottle decorating station B where one color portion of the entire decoration is applied to the top surface of bottle 13. The conveyor 11 then indexes so that chucking device 12 is next positioned in line with the bottle rotating station C where the bottle is rotated 180° about its longitudinal axis to prepare for decoration of its opposite surface. The conveyor 11 next indexes to the second bottle decorating station B where the next portion of the decoration is applied. After the next indexing, the bottle 13 is positioned at a second bottle rotating station C where it is again rotated 180° and is next indexed to the third bottle decorating station B where a different color portion of the decoration is applied on the side of the bottle 13 decorated at the first decorating station B. Subsequent indexing of bottle chucking device 12 presents the bottle at unloading station D where it is released and removed from the machine.

Referring now to Figs. 3–6, the bottle chucking devices 12 of the invention will be described in detail. Each such device 12 consists of a base 14 having end lugs 15 for providing a pin connection mounting on cross-beds 11C on conveyor 11 (hereinafter described). At the upper side of base 14, a pair of horizontal arms 16 are pivotally mounted at one of their ends on pivot pins 17 (Fig. 6), which extend through base 14 and are journalled in a housing 18 in bottom plate 19 fastened to the underside of base 14 by screws 20 (Fig. 5). Each pin 17 has a pinion gear element 21 keyed to it by a transverse pin 22 (Fig. 6) so that they are positioned in the cavity formed between base 14 and its bottom plate 19. A rack gear element 23 is provided for reciprocating movement in base 14 in longitudinal slot 24 so that the teeth of rack gear element 23 are in mesh with the teeth of both pinion gear elements 21 (shown in phantom outline in Fig. 3). A helical spring 25 is fitted in a longitudinal compartment 26 bored in rack gear element 23 (Fig. 5). Spring 25 is compressed between the end of compartment 26 and a fixed pin 27 held at its end in base 14 and bottom plate 19. A longitudinal slot 28 is provided in rack gear element 23 to accommodate pin 27 and thereby permits limited reciprocating movement of element 23 imparted by or against spring 25. Thus, rack gear element 23 is normally forced outwardly longitudinally of base 14 by the resilient force of spring 25 (to the left in Fig. 5). In this position, and under forces of spring 25, the gripping device of the chuck (which will be presently described is normally closed).

At the outer ends of arms 16 are a pair of upright pins 29 having brackets 30 mounted intermediate their length, which comprise in combination an opposed pair of bottle gripping members. A cradle member 31 is mounted on the base 14 and spaced longitudinally thereon from the gripping members 29—30. As seen in Figs. 4 and 5, cradle member 31 has a centrally disposed semi-circular contour for receiving the circular end portion of the particular shape of bottle 13 shown. The cradle member 31 is fastened to its mounting 31A by cap screws 31B to facilitate interchange of various other cradle members 31 to accommodate the end portion of the particular shape of bottle to be decorated. Thus, if the production set-up for the bottles need be changed from one size of neck contour to another, a corresponding cradle member 31 may be inserted. The cradle member mounting 31A (Fig. 4) is slidably adjustable horizontally with respect to the gripping members 29—30 by having a vertically tapered grooved mounting 31A slide on carriage 14A of base 14. The proper longitudinal adjustment may hence be made to accommodate various lengths of bottles by varying the longitudinal spacing between cradle member 31 and the gripping members 29—30. The mounting 31A for cradle member 31 is set at the desired horizontal position by tightening set screw 31C on to carriage 14A of base 14 (Fig. 5).

Normally, the gripping members 29—30 of the chucking device 12 are held closed by the force of spring 25, as previously described. When a bottle 13 is to be loaded at loading station A into a chucking device 12, rack gear element 23 is actuated inwardly (toward the top in Fig. 3). Independent means for providing this actuating movement will be presently described. This actuation causes pinion gear elements 21 to rotate counter to one another and open the bottle gripping members 29—30. The bottle is then inserted so that its neck portion is received in cradle member 31 to provide a vertical and lateral support therefor. The bottle gripping members 29—30 are then closed by releasing the force exerted to overcome spring 25 of rack gear element 23 and spring 25 then closes bottle gripping members 29—30 about an intermediate portion of bottle 13. Thus, when the said gripping members are closed, they cooperate with the cradle member 31 to hold the bottle in a horizontally and laterally aligned position for decorating. The closed bottle gripping members provide a second positioned vertical and lateral support for the portion of the bottle held.

In Fig. 2, conveyor chains 11A and 11B are provided with a number of cross beds 11C. A bottle chucking device 12 is pivotally connected to each cross-bed 11C by a pin 15B through lugs 15 and a receiving portion therefor (not shown) integral on one end of cross-bed 11C. The chains 11A and 11B are laterally positioned to run in proper alignment on the machine 10 by the combination of guides 32 integral with machine frame 10A. Chain guides 32 lie in the desired line of travel of conveyor 11. Cross-beds 11C ride against a guide plate 33 which is provided integral on frame 10A and extends parallel with chain guides 32. At the opposite side of bottle chucking device 12 an integral downward extension 14B of base 14 has a roller 14C pivotally mounted to run in an overlying guide channel 34. Guide channel 34 is coextensive with the endless conveyor 11 and may be provided with a groove that has a vertically upwardly inclined span of channel 34 at either the loading or unloading station. This inclined span will tilt the bottle chucking device clockwise (Fig. 2) about its pivot pin 15 to allow access for automatically loading bottles from a conveyor at the loading station or to automatically unload bottles onto a conveyor at the unloading station.

Having just described the bottle chucking device of the invention, the operation of the chucking device and the various other means for performing the different operations of the decorating cycle will now be described.

Fig. 2 shows a view taken through the center of bottle rotating station C of Fig. 1, and since the operation of this station is the more complex of the group in the cycle, it will be explained first, the remaining operations of the group of operations in the cycle which occur at stations other than the bottle rotating station will then, in part at least, become obvious.

At the position shown on Fig. 2, the bottle 13 is held in its chucking device 12 just prior to rotation. However, in Fig. 1, bottle 13 is shown after it has rotated 90° of the necessary 180° rotation. To rotate the bottle 13, a fluid operated cylinder piston assembly 35 is supported on frame 10A at the bottle rotating station C so that the piston rod 36 of its piston 37 is axially aligned with the neck opening of bottle 13. Piston rod 36 has a plug 38 which is adapted to fit into the neck opening of bottle 13, but is held normally retracted therefrom by spring 39 compressed between piston 37 and the closed end 40 of cylinder 35A. Plug 38 is inserted into the neck opening of bottle 13 by injecting pressure fluid into cylinder 35A through pipe 41.

During the travel through the operating stations of machine 10, the bottles 13 have their closed end bearing against a guide rail 42 which is supported on frame 10A by a bracket 43. The primary aligning function of guide rail 42 will be presently described more in detail.

Opposite plug 38, and in axial alignment therewith, a rotatable member 44 is operatively connected to the piston 45 of a reciprocable cylinder-piston assembly 46. The rotatable member 44 has a pin connected jaw-clutch element 44A mounted thereon and engageable with a complementary clutch element 47 enclosing piston rod 48 of cylinder piston assembly 46. The clutch element 47 is connected as the shaft of rotatable fluid motor 49 supported on frame 10A. At the opposite side of motor 49 (right hand side in Fig. 2), its shaft element 47 fits in a bore of housing 50 and compresses spring 51 against piston 45 to normally hold rotatable element 44 retracted from the closed end of bottle 13. Housing 50 is coupled to driving element 47 by set screw 52. As plug 38 is engaged in the open end of bottle 13, fluid is also introduced in pipe 53 to force piston 45 of cylinder-piston assembly 46 to the left in Fig. 2 and engage rotatable member 44 with the closed end of bottle 13. Since closed end 40 of the cylinder-piston assembly 35 and its piston 37 are held separated by the force of spring 39 (as indicated by the spacing 54), axial force exerted through the rotatable member 44 against the closed end of bottle 13 tends to further compress spring 39 and close the gap 54 between piston 37 and closed end 40. In so doing, the bottle 13 is shifted axially away from guide rail 42 (see relationship of closed end of bottle 13 and guide rail 42 in Fig. 1).

Prior to rotating the bottle 13, the bottle gripping members 29—30 are opened (as shown on Fig. 1) by independent means mounted on frame 10A, to be hereinafter described.

The bottle is then rotated about its longitudinal axis the desired amount through actuation of motor 49, driving clutch element 47, the complementary driven clutch element 44A and rotatable element 44 bearing against the close end of the bottle.

Fig. 7 shows the details of the rotational control of motor 49. Housing 50 has an integral flange 50A which is located adjacent to bracket 55 bolted to frame 10A. Bracket 55 has two corner notches 56 and 57 radially aligned with protruding lugs 58 and 59 spaced 90° apart on flange 50A. Motor 49, when actuated, is first set to rotate shaft 48 and flange 50A clockwise. Lug 58 rotates with flange 50A until it engages in notch 56 on bracket 55. This is set to occur after 180° of rotation. The motor 49 being prevented from further clockwise rotation then disengages, and when engaged to rotate the next bottle presented at this station C, the motor will reverse its direction. This next rotation in the counterclockwise direction is also limited to 180° by permitting lug 59 to rotate in that direction until it engages notch 57 on bracket 55 (as shown in Fig. 7).

The amount of rotation permissible may be adjusted to 90° in either direction by shifting lug 58 to hole 60 in flange 50A. Lugs 58 and 59 would then be located diametrically opposite each other on flange 50A. This adjustment will facilitate rotating a bottle to decorate two of its sides successively.

After the rotation of bottle 13 has been completed at station C, the bottle gripping members 29—30 are again closed to hold the bottle ready for indexing to the decorating station B (Fig. 1). Prior to indexing, plug 38 and rotatable member 44 are retracted from engagement with the bottle by releasing the fluid pressure in lines 41 and 53 of cylinder-piston assemblies 35 and 46, respectively.

The independent means for opening gripping members 29—30 of the bottle chucking devices 12 operate as follows:

A fluid operated cylinder-piston assembly 61 (Fig. 2) is supported on frame 10A vertically beneath cylinder-piston assembly 35 and has its piston rod 62 aligned to engage the outer end of rack gear element 23. Piston rod 62 is normally held out of engagement with element 23 by spring 63 compressed between piston 61A and the inner end of cylinder 61B. To open the gripping members 29—30 of bottle chucking device 12, fluid is introduced under pressure through line 64. Piston rod 62 then engages the end of rack gear element 23 which transmits motion to rotate the bottle gripping members 29—30 in opposite directions and release their grip on the bottle 13. When fluid pressure in line 64 is released, the spring 63 again retracts piston rod 62 and the spring element 25 (Fig. 5) in rack gear element 23 closes the grip members 29—30 about the bottle 13.

When the bottle chucking device 12 and its bottle 13 are next indexed to a decorating station B, a cylinder piston assembly 35 carrying a plug 38 is actuated by fluid pressure to insert plug 38 in the open end of bottle 13. In this manner, the bottle is longitudinally aligned in the decorating position against guide rail 42.

At the decorating stations B, the bottle underlies a decorating screen assembly 65 having operating contact with the underside of its screen. The color for the decoration is applied through the screen by reciprocating movement of a squeegee element (not shown), the operation of which is well understood in the bottle decorating art.

When at the loading and unloading stations A and D, respectively, the bottle chucking device 12 is actuated to open its bottle gripping members 29—30 to receive or release the bottle 13 by having similar cylinder-piston assemblies 61 (whose function was previously described) to engage rack gear element 23 and actuate it to open position.

It should be understood that, although specific mention in the description of the invention is made to its use in connection with decoration of bottles, the invention may be readily adapted for decoration of similar work pieces. Accordingly, various modifications may be resorted to within the spirit and scope of the appended claims.

I claim:

1. Bottle chucking device for horizontally and laterally aligning irregularly shaped bottles for decorating in a decorating machine, including an endless carriage adapted to be driven intermittently in one direction past loading, rotating, decorating, and unloading stations of the machine, said device comprising a base mounted on said carriage for travel by indexing movement through the bottle decorating cycles of said machine, a cradle member mounted on said base and adapted to receive a bottle to be decorated at its side wall and near one end of the bottle to provide one positioned vertical and lateral support therefor, a pair of horizontal arms pivotally mounted on said base, a pair of opposed bottle gripping members mounted on said pivotal arms and adapted to open and close laterally about the sides of said bottle at a point thereon remote from said cradle member to provide a second positioned vertical and lateral support at its side wall surfaces other than the surface undergoing decoration, said gripping members, when closed, cooperating with said cradle member to hold the bottle in a horizontally and laterally aligned position, means operatively connected to said arms to pivot them counter to one another, said means normally tending to hold said bottle gripping members closed by actuation in one direction and actuable in the opposite direction to pivot said arms and open said bottle gripping members, guide means on said machine constructed and arranged for engaging one end of a bottle at each decorating station to horizontally align the bottle axially thereat in decorating position, and means at each decorating station operable to engage the opposite end of the bottle and hold the bottle against said guide means.

2. The device defined in claim 1, wherein said cradle member is mounted on said base for slidably adjusting it thereon horizontally with respect to the pivoted end of the said horizontal arms.

3. The device defined in claim 2, wherein said gripping members each comprise an upright pin mounted outwardly on each of said horizontal arms to bear, when said arms are actuated to close, against opposite sides of the bottle, and a bracket mounted on each said pin adapted to vertically support that end of the bottle in its decorating posiion while undergoing decoration.

4. The device defined in claim 1, wherein said means for actuating the pivotal arms comprises a pinion gear element carried by the pivoted end of each of said arms, a reciprocable rack gear element having its teeth in mesh with the teeth of at least one of said pinion gear elements to impart counter rotation to each of said arms about its pivotal mounting in either direction of rotation, means carried in said base cooperating with said rack gear element to normally tend to rotate said arms towards each other and thereby close the gripping members, and means on the decorating machine adapted for engagement with said rack gear element to overcome said last-mentioned means and rotate said arms away from each other to open the gripping members.

5. A chucking device for aligning irregularly shaped work pieces for decorating in a decorating machine comprising a base adapted to be mounted on said machine for travel by indexing movement through the decorating cycles of said machine, a cradle member mounted on said base and adapted to receive a work piece to be decorated, said cradle member engaging the side of the work piece and near one end thereof for vertically and laterally positioning said end portion thereof in its decorating position, gripping means carried on said base and actuable to open and close laterally about the sides of the work piece after it is received in said cradle member, said gripping means, when closed, cooperating with said cradle member to finally align the work piece horizontally and laterally in its decorating position and lock the work piece in position for applying a decoration to a surface thereof, and means to actuate said gripping means to open and close, said means being normally set to close said gripping means.

6. An automatic decorating machine having a frame and an endless traveling conveyor thereon adapted to be driven by intermittent movement in a path in underlying relationship past a plurality of decorating screens each mounted on said frame at spaced bottle decorating stations, decorating means each adaptable for applying a predetermined color decoration to an irregularly shaped bottle, in combination therewith a plurality of bottle checking devices carried by said conveyor at spaced longitudinal distances and adapted for indexing movement therewith through a bottle loading station, a plurality of said bottle decorating stations, one or more bottle-rotating stations, each located intermediate adjoining bottle decorating stations, and a bottle unloading station on the machine, each said chucking device comprising a base mounted on said conveyor, a cradle member mounted on said base and adapted to receive a bottle to be decorated, said cradle member being in nesting engagement with the side of the bottle and near one of its ends and constructed and arranged to permit rotation of the bottle while nesting thereon and provide a positioned vertical and lateral support for that end portion of the bottle, bottle gripping means carried on said base and actuable to open and close laterally about the sides of said bottle near its other end, said gripping means, when closed, cooperating with said cradle member to align said received bottle and hold it in horizontal and lateral alignment suitable for decorating, means in said base operatively associated with said bottle gripping means tending to normally close said gripping means, means at each decorating station supported on the frame and operable to be axially engageable with the ends of the bottle for longitudinally aligning the bottle thereat, means at each bottle rotating station for rotating the bottle a predetermined amount about its longitudinal axis, and a plurality of independent means adapted for overcoming said means normally closing the gripping means of each said bottle chucking device, thereby opening the said gripping means to permit alternatively the operations of loading, rotating and unloading a bottle as each said bottle chucking device is positioned at the corresponding station of the machine for performing said operations.

7. The combination defined in claim 6, wherein the bottle gripping means of each bottle chucking device comprises a pair of spaced horizontal arms pivotally mounted on the base, and a pair of spaced bottle gripping members mounted on said pivotal arms for gripping a bottle therebetween.

8. The combination defined in claim 7, wherein the means associated with the bottle gripping means of each bottle chucking device tending to normally close said gripping means comprises a pinion gear element integral with the pivoted end of each of said arms, a reciprocable rack gear element having its teeth in mesh with the teeth of at least one of said pinion gear elements whereby to impart counter rotation to each of said arms in either direction, a spring assembly mounted in said base and operatively connected to said rack gear element to normally force said rack gear element in the direction to impart rotation to said arms to close the bottle gripping members.

9. The combination defined in claim 8, wherein said pinion gear elements are laterally spaced and said reciprocable rack gear element has its teeth in mesh with teeth of both said pinion gear elements, thereby imparting counter rotation to each of said arms in either direction upon reciprocating movement of said rack gear element.

10. The combination defined in claim 8, wherein each said independent means of said plurality of independent means comprises a power driven reciprocable element mounted on the frame of said machine at each of said loading, indexing and unloading stations and engageable, upon powered reciprocation in one direction, with the rack gear element of one of the bottle chucking devices when the latter is positioned adjacent said reciprocable element whereupon actuation thereof opposes the spring assembly and actuates the bottle gripping members to open.

11. The combination defined in claim 6, wherein said means for longitudinally aligning the bottle at each decorating station comprises a guide rail member mounted on the frame at one side of the conveyor and in overlying and parallel relation thereto to define the longitudinal alignment for the closed end of the bottle, a normally retracted plug supported on the frame to register with the open end of the bottle held in its chucking device while at the bottle decorating station, and a fluid-operated cylinder piston assembly operatively connected to said plug actuable to engage it with the open end of the bottle prior to decorating to hold the bottle against the said guide rail member in longitudinal alignment for the decorating operation at that station.

12. The combination defined in claim 6, wherein the means at each bottle rotating station for rotating the bottle therein a predetermined amount about its longitudinal axis comprises a normally retracted plug supported on the frame to register with the open end of the bottle held in its chucking device while at said station, a normally retracted rotatable member supported on the frame aligned opposite said plug and engageable with the closed end of said bottle, independent fluid operated cylinder pistons operatively connected to said plug and said rotatable member each actuable to engage them, respectively, with the open and closed ends of the bottle and a motor having a driving connection to said rotatable member and adapted to impart a predetermined amount of rotation thereto responsive to opening the bottle gripping means of the bottle chucking device by actuation of the said independent means, thereby rotating the bottle a corresponding amount about its longitudinal axis to present a different surface for decorating at the next successive decorating station.

13. The combination defined in claim 12, wherein the means for longitudinally aligning the bottle at each decorating station comprises a stationary guide rail member engageable with the closed end of the bottle, said member extending parallel to the path of the conveyor and along the bottle decorating and rotating stations, a reciprocal member individual to each decorating station and operable for engagement with the open end of the bottle, and a fluid operated reciprocating motor connected to reciprocate each said reciprocable member, whereby movement of said reciprocable member toward said guide rail seats the bottle against said rail member and retains it in a longitudinal aligned position for decorating.

14. The combination defined in claim 13, wherein the normally retracted plug at each said rotating station is axially yieldable when engaged with the open end of the bottle, whereby said plug yields slightly under axial force of the rotatable member engaging the closed end of the bottle to unseat the bottle from its engagement with the guide rail member.

15. An automatic decorating machine having a frame and an endless traveling conveyor thereon adapted to be driven by intermittent movement in a path in underlying relationship past one or more decorating screens of decorating devices each mounted on said frame at spaced decorating stations and adaptable for applying a predetermined color decoration to an irregularly shaped workpiece, in combination therewith a plurality of chucking devices carried by said conveyor at spaced longitudinal distances and adapted for indexing movement therewith through a work piece loading station, one or more decorating stations, and a work piece unloading station on the machine, each said chucking device including a cradle member mounted on said base and adapted to receive a work piece to be decorated and support it near one of its ends at a side surface of the work piece, gripping means actuable to open and close laterally about opposite side surfaces of said work piece, said gripping means, when closed, cooperating with said cradle member at spaced longitudinal distances to align said received work piece and hold it so that a surface of the work piece is aligned at a vertical elevation and in a laterally aligned position suitable for decorating, and means operatively associated with said gripping means tending to normally close said gripping means, means supported on the frame at each of said one or more decorating stations and axially engageable with opposite ends of the work piece for longitudinally aligning the work piece thereat, said means together with the chucking device placing the work piece in registry for decoration, and one or more independent means adapted for overcoming said means normally closing the gripping means of each of said chucking device, thereby opening the said gripping means to permit alternatively the operations of loading and unloading the work piece as each said chucking device is positioned at the corresponding station of the machine for performing said operations.

16. A chucking device for aligning work pieces for decorating in a decorating machine comprising a base adapted for carriage by indexing movement through the decorating cycles of such machine, a cradle member mounted on said base and adapted to receive a work piece to be decorated, said cradle member engaging the side of the work piece near one end thereof for vertically and laterally positioning said end portion thereof in its decorating position, opposed gripping members, means mounting said gripping members on said base for movement toward and away from each other between open and closed positions, said members, when closed, engaging opposed sides of the work piece to firmly hold it in position for applying a decoration to a surface thereof, and means for moving said gripping members to said closed position.

References Cited in the file of this patent

UNITED STATES PATENTS

| | | |
|---|---|---|
| 2,111,207 | Denelsbeck | Mar. 15, 1938 |
| 2,132,818 | Cone | Oct. 11, 1938 |
| 2,157,638 | Soubier | May 9, 1939 |
| 2,179,220 | Schneider | Nov. 7, 1939 |
| 2,183,223 | Mankin et al. | Dec. 12, 1939 |
| 2,739,531 | Hagerman | Mar. 27, 1956 |